US00RE38230E

(19) United States
(12) Reissued Patent
Gueret

(10) Patent Number: US RE38,230 E
(45) Date of Reissued Patent: Aug. 26, 2003

(54) BRUSH HAVING PLANO-CONVEX PROFILE

(75) Inventor: Jean-Louis H. Gueret, Paris (FR)

(73) Assignee: L'Oreal, Paris (FR)

(21) Appl. No.: 09/773,946

(22) Filed: Feb. 2, 2001

Related U.S. Patent Documents

Reissue of:
(64) Patent No.: 5,894,847
Issued: Apr. 20, 1999
Appl. No.: 08/871,432
Filed: Jun. 9, 1997

(30) Foreign Application Priority Data

Jun. 7, 1996 (FR) ..... 96 07108

(51) Int. Cl.[7] ..... A45D 40/26
(52) U.S. Cl. ..... 132/218; 132/313; 132/317; 132/320; 401/122; 15/206
(58) Field of Search ..... 132/218, 313, 132/317, 320; 401/122, 129, 153; 15/60, 206, 207.2, 164

(56) References Cited

U.S. PATENT DOCUMENTS

| | | | | |
|---|---|---|---|---|
| 565,328 | A | | 8/1896 | Buhler |
| 1,806,520 | A | | 5/1931 | Cave |
| 1,962,854 | A | | 6/1934 | Anderson |
| 2,448,603 | A | * | 9/1948 | Kevin et al. ..... 15/184 |
| 3,033,213 | A | | 5/1962 | Joss et al. |
| 3,214,782 | A | | 11/1965 | Masters et al. |
| 3,469,928 | A | | 9/1969 | Widegren |
| 3,908,675 | A | | 9/1975 | Spatz et al. |
| 3,908,676 | A | | 9/1975 | Levine et al. |
| 3,921,650 | A | | 11/1975 | Montgomery |
| 4,403,624 | A | | 9/1983 | Montgomery |
| 4,458,701 | A | | 7/1984 | Holland |
| 4,461,312 | A | | 7/1984 | Gueret |
| 4,527,575 | A | | 7/1985 | Vasas |
| 4,545,393 | A | | 10/1985 | Gueret et al. |
| 4,586,520 | A | | 5/1986 | Brittain |

(List continued on next page.)

FOREIGN PATENT DOCUMENTS

| | | |
|---|---|---|
| DE | 42 05 935 | 9/1993 |
| EP | 0 511 842 A1 | 11/1992 |

(List continued on next page.)

OTHER PUBLICATIONS

U.S. Reissue Application for U.S. Pat. No. 5,860,432, filed on Jan. 18, 2001.

U.S. Reissue Application for U.S. Pat. No. 5,853,011, filed on Dec. 22, 2000.

English language Derwent Abstract of JP 56–91507, Jul. 24, 1981.

English language Derwent Abstract of JP 58–88912, May 27, 1983.

English language Derwent Abstract of JP 5–88410, Apr. 9, 1993.

Co–pending Reissue Application No. 09/745,255; Title: Progressive Brush for Applying a Cosmetic Product, Inventor(s): Jean–Louis H. Gueret, U.S. Filing Date: Dec. 22, 2000.

Co–pending Reissue Application No. 09/761,701; Title: Brush Having a Plano–Concave Profile Inventor(s): Jean Louis H. Gueret, U.S. Filing Date: Jan. 18, 2001.

*Primary Examiner*—Pedro Philogene
(74) *Attorney, Agent, or Firm*—Finnegan, Henderson, Farabow, Garrett & Dunner, L.L.P.

(57) ABSTRACT

A brush (200) has a straight stem (201) defining a main axis (X—X), a flexible core (202) having a first and a second end, the first end being integral with the stem, and bristles (204) implanted radially in the core. The end of the bristles defining the surface (205) of the brush have a first face, the intersection of any meridian plane passing through the main axis with the surface of the brush defining two peak lines (207) having a specific curvature. The core is curved, the peak lines (207) are convex, and the first face (207.1) is substantially straight and parallel to the main axis (X—X).

174 Claims, 2 Drawing Sheets

U.S. PATENT DOCUMENTS

| | | | | | |
|---|---|---|---|---|---|
| 4,662,385 | A | | 5/1987 | Schefer | |
| 4,784,505 | A | | 11/1988 | Dahm | |
| 4,804,004 | A | | 2/1989 | Taylor | |
| 4,810,122 | A | | 3/1989 | Cole | |
| 4,887,622 | A | | 12/1989 | Gueret | |
| 4,898,193 | A | | 2/1990 | Gueret | |
| 4,921,366 | A | | 5/1990 | Hurrell | |
| 4,927,281 | A | | 5/1990 | Gueret | |
| 4,993,440 | A | | 2/1991 | Gueret | |
| 5,094,254 | A | | 3/1992 | Krueckel et al. | |
| 5,137,038 | A | * | 8/1992 | Kingsford | 132/218 |
| 5,197,497 | A | | 3/1993 | Gueret | |
| 5,224,787 | A | | 7/1993 | Vasas | |
| 5,238,011 | A | | 8/1993 | Gueret | |
| 5,339,841 | A | * | 8/1994 | Gueret | 132/218 |
| 5,345,644 | A | | 9/1994 | Gueret | |
| 5,357,987 | A | | 10/1994 | Schrepf | |
| 5,418,999 | A | | 5/1995 | Smith | |
| 5,482,059 | A | | 1/1996 | Miraglia | |
| 5,542,439 | A | | 8/1996 | Gueret | |
| 5,551,456 | A | | 9/1996 | Hartel | |
| 5,595,198 | A | * | 1/1997 | Kemmerer | 132/218 |
| 5,613,258 | A | | 3/1997 | Hilfinger et al. | |
| 5,709,230 | A | | 1/1998 | Miraglia | |
| 5,722,436 | A | | 3/1998 | Vandromme et al. | |
| 5,853,011 | A | | 12/1998 | Gueret | |
| 5,860,432 | A | | 1/1999 | Gueret | |
| 5,876,138 | A | | 3/1999 | Gueret | |
| 5,894,847 | A | | 4/1999 | Gueret | |
| 5,934,292 | A | | 8/1999 | Gueret | |
| 5,937,870 | A | | 8/1999 | Gueret | |
| 6,067,997 | A | | 5/2000 | Gueret | |

FOREIGN PATENT DOCUMENTS

| | | | |
|---|---|---|---|
| EP | 0 663 161 | A1 | 7/1995 |
| EP | 0 511 842 | B1 | 6/1998 |
| FR | 726 157 | | 5/1932 |
| FR | 2 285 101 | | 4/1976 |
| FR | 2 505 633 | | 11/1982 |
| FR | 2 605 505 | | 4/1988 |
| FR | 2 678 494 | | 1/1993 |
| FR | 2 701 198 | | 8/1994 |
| FR | 2 715 038 | | 7/1995 |
| FR | 2 730 910 | | 8/1996 |
| FR | 2 730 911 | | 8/1996 |
| GB | 2146520 | | 4/1985 |
| JP | 56-91507 | U | 12/1954 |
| JP | 56-91507 | | 7/1981 |
| JP | 58-88912 | | 5/1983 |
| JP | 58-88912 | U | 6/1983 |
| JP | 5-88410 | | 4/1993 |
| JP | 5-88410 | U | 12/1993 |
| WO | WO 93/16617 | | 9/1993 |
| WO | WO 96/29905 | | 10/1996 |

* cited by examiner

BRUSH HAVING PLANO-CONVEX PROFILE

Matter enclosed in heavy brackets [ ] appears in the original patent but forms no part of this reissue specification; matter printed in italics indicates the additions made by reissue.

BACKGROUND OF THE INVENTION

Field of the Invention

The invention relates to a brush, in particular a brush for applying a cosmetic product to keratinous fibers, especially for applying a mascara to the eyelashes or a dye to the hair, and to a make-up device which comprises this brush and has a substantially plano-convex profile.

Conventionally, a brush for applying a cosmetic product comprises an elongate core formed by helically winding two branches of a metal wire and bristles implanted radially in this core and gripped between these wound branches. Such brushes may be of various shapes and may have cutouts. If these brushes are used for applying mascara to the eyelashes, such shapes and such cutouts are provided in order to make it possible to obtain more or less heavy make-up or a greater or lesser elongation and curving of the eyelashes.

The prior art, for example FR-A-2715038, discloses mascara brushes having a substantially convex shape, such as for example the shape of a rugby ball, a flat notch having been cut out in the brushes over their entire length. Since the bristles of the flat notch are short, they are wiped off only slightly on exit from the reservoir containing the mascara; such brushes provide very heavy make-up.

Brushes are also known having the shape of a portion of a torus, these brushes being obtained by twisting the core of a cylindrical brush in an arc of a circle. Such brushes have a convex face, a concave face and two substantially plane faces. Such brushes are not very easy to handle; in fact if the user rotates the stem of such a brush about its axis between her fingers, for example in order to apply a product to the eyelashes, she must continually correct the distance between the brush and the eyelashes. Moreover, it was found that such a brush loaded the eyelashes, but without smoothing them sufficiently. Brushes obtained by twisting the core of a cylindroconical brush in an arc of a circle have the same disadvantages.

SUMMARY OF THE INVENTION

Although these conventional brushes give substantially satisfactory results, it is desirable to have brushes which take good hold of the eyelashes in order to ensure effective smoothing of the product, good separation of the eyelashes, and a relatively light make-up. It is therefore an object of the invention to provide a brush useful for the simple, economical and practical application of makeup.

To this end, the invention provides a brush for applying a cosmetic product which, when used to apply mascara to the eyelashes, make it possible to obtain make-up which is natural, that is to say relatively light, but with the lashes appreciably lengthened, these brushes, moreover, being very easy to handle.

According to a first aspect of the invention, the brush comprises a straight stem defining a main axis; a flexible core comprising a first and a second end, the first end being integral with this stem; and bristles implanted radially in this core, the ends of the bristles defining the surface of the brush, this surface comprising a first face. The intersection of any plane which passes through the main axis, herein called the meridian plane, with the surface of the brush defines two convex curves (i.e., their concavity faces the inside of the brush) called peak lines, having a specific curvature. The first face is substantially straight and parallel to the main axis.

The curvature of each peak line is the reciprocal: 1/r of its radius of curvature r. At each point of the core, the intersection of the surface of the brush with any plane perpendicular to the core defines a cross-section of the brush. Preferably, the core is centrally positioned in each cross-section of the brush. The faces are longitudinal portions of the surface of the brush.

Preferably, the surface of the brush comprises at least one second face, called a face of maximum curvature, at which the curvature of the peak lines passes through a maximum in the region of this second face.

Advantageously, the curvature of the peak lines has a single maximum. Preferably, the surface of the brush comprises a single straight face. More preferably, the curvature of the peak lines increases continuously from the straight face to the peak line of maximum curvature. Preferably, the face of maximum curvature and the straight face are diametrically opposite one another with respect to the core. Advantageously, the bristles of the same cross-section are all of the same length.

According to a second aspect of the invention, the brush is manufactured by the steps of forming a starting brush having a straight stem, and imparting a curve to the core in said meridian plane, said curve having a curvature substantially equal to the curvature of one of the two meridian lines of said meridian plane and being in an opposite direction to the curvature of one meridian line.

At each point of the core, the intersection of the surface of the starting brush with any plane perpendicular to the core defines a cross-section of the starting brush. Preferably, the starting brush is selected in such a way that the core is central in each cross-section of the starting brush.

The surface of the starting brush is thus modified in that one meridian line is converted into a substantially straight peak line, and the curvature of the second meridian line belonging to the same meridian plane is increased substantially. The core remains central in each cross-section of the brush, but these cross-sections are no longer parallel.

Desirably, a twist is imparted to said first end of the core in order to align the second end of the core with the main axis. The brush may thus be used with a mascara reservoir equipped with a wiper of conventional design.

Preferably, one of the meridian planes of the surface of the starting brush is a plane of symmetry of the starting brush. If appropriate, the starting brush comprises a plane of symmetry perpendicular to the axis of the core.

Preferably, the surface of this starting brush is a surface of revolution. Advantageously, each cross-section of the starting brush is convex.

This brush is perfectly suitable for making up eyelashes, and therefore a third aspect of the invention provides a make-up device comprising a mascara reservoir and a brush according to the invention for the application of mascara.

The brush according to the invention has a continuous evolute profile which is plano-convex in relation to its main axis, i.e., when the brush executes a revolution about its main axis, for example when the user rotates the stem of the brush between her fingers, it evolves from a substantially plane face, which surrounds the straight peak line parallel to the main axis, towards a convex face of increasing radius of curvature, to reach maximum curvature, then decrease and return to a plane face.

The substantially plane profile is located in the concavity of the brush. Since each cross-section is perpendicular to the core at any point of the latter, the bristles of the brush have a density higher than the rest of the brush along this plane profile. Moreover, these bristles converge. The density of the bristles decreases progressively from the plane face to the face of maximum curvature. Preferably, the face diametrically opposite the straight face with respect to the core is that having the greatest curvature. This face thus has a much lower bristle density, and these bristles diverge.

When the user uses this brush in order to apply a make-up product to the eyelashes, she extracts the brush from the product reservoir, the brush passing through a wiper. If the bristles in the same cross-section are all of the same length, they are all wiped. However, the face comprising a substantially plane profile is wiped to a lesser extent because the bristles converge and are very dense. By contract, the face having the greatest curvature is wiped to a greater extent, since the distribution of the bristles is highly spaced out. The user places the brush against the eyelashes and rotates it between her fingers: the brush loads each eyelash with product by means of its plane profile, then it combs the eyelash, lengthens it and curves it by means of the rest of its surface. The make-up thus obtained is relatively light, and the lash appreciably lengthened and highly curved.

Furthermore, the bristles of a brush according to the invention may be of any type: they may be bristles of different lengths, of different diameters or different cross-sections and of different materials, bristles with tapered ends, fork-shaped ends or ends in the form of a pinhead, or bristles which have undergone any kind of treatment known in the art.

There may also be provision for the brush according to the invention to comprise alternate rows of short bristles and long bristles, the long bristles alone defining the surface of the brush. Such a version of the invention makes it possible to increase the loading of the eyelid with product.

The helical winding of the two branches of the metal wire forming the core may be provided so as to have a right-hand pitch, as is conventional in the manufacture of make-up brushes, or a left-hand pitch, as taught by FR-A-27011098. To manufacture a brush with a left-hand pitch, the branches of the core are twisted by rotating them to the left in order to form turns which rotate clockwise around the core, starting from the stem and advancing towards the end of the brush.

The brush with a left-hand pitch is preferred for the production of brushes according to the invention: this gives the bristle turns an orientation which makes it possible to separate the eyelashes more effectively during make-up.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1A:
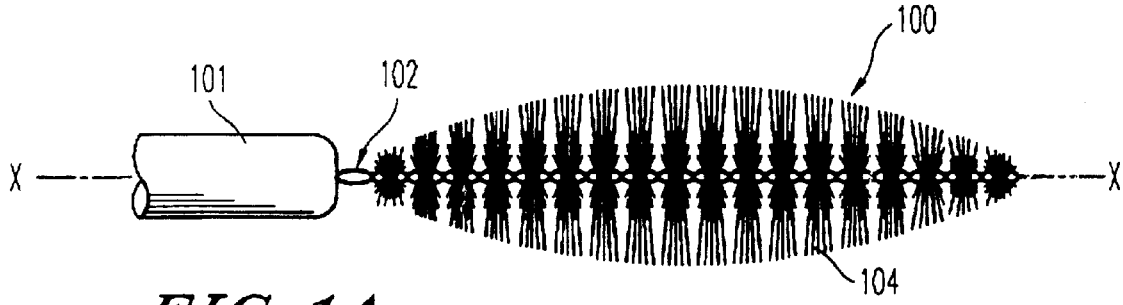
FIGS. 1A and 1B are perspective views of a brush capable of being modified according to the invention.
Figure 1B:
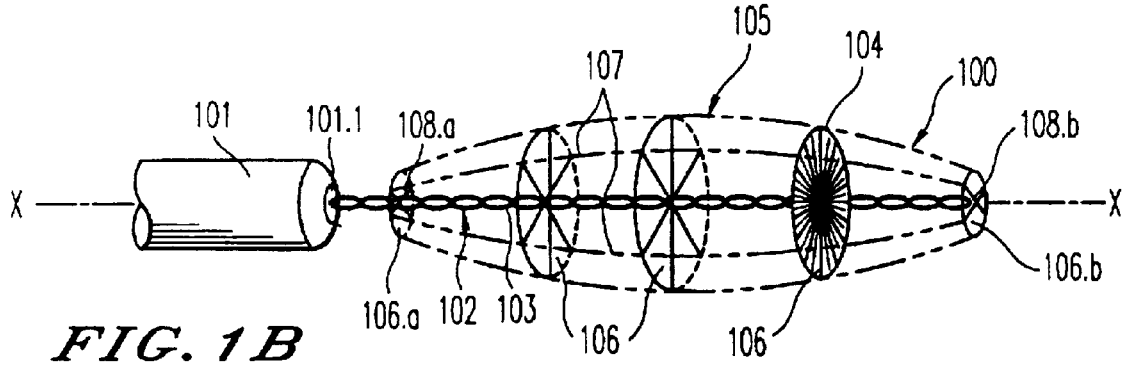

The brush 100 illustrated in FIGS. 1A and 1B comprises a straight stem 101 defining a main axis X—X. Fastened by force fitting to the end 101.1 of this stem 101 is an elongate core 102 (which has been illustrated in these figures, although it is hidden by the bristles of the brush) formed by the helical winding of two branches of a metal wire 103 which has been bent in the form of a U before the branches are twisted. The axis of the core 102 coincides with the main axis X—X. Bristles 104 are implanted radially between the branches of the wire 103. When the branches of the wire 103 are twisted, the bristles are gripped and held between the helical turns of the core 102. The ends of the bristles 104 define the surface of the brush 105: this is a surface of revolution which has the shape of a rugby ball and the ends of which consist of two cross-sections, namely the disk 106.a having the center 108.a and the disk 106.b having the center 108.b. Each cross-section 106 of the brush 100 has the shape of a disk, all the cross-sections 106 being parallel to one another. The intersection of the surface 105 with any meridian plane of the brush defines meridian lines 107 which are all identical and which have the same radius of curvature r.

A first twist is imparted to the core 102 in a meridian plane, between the cross-sections 106.a and 106.b, by means of a suitable tool, for example by pressing the core longitudinally around a metal cylinder having a radius of curvature r, in such a way that the said core takes the form of one of the meridian lines 107, and then a second twist is imparted thereto in the same plane, between the end 101.1 of the stem and the center 108.a of the end cross-section of the brush, so as to align the center 108.b of the other end of the brush with the main axis X—X, in the same way as the first end 108.a.

Figure 2A:
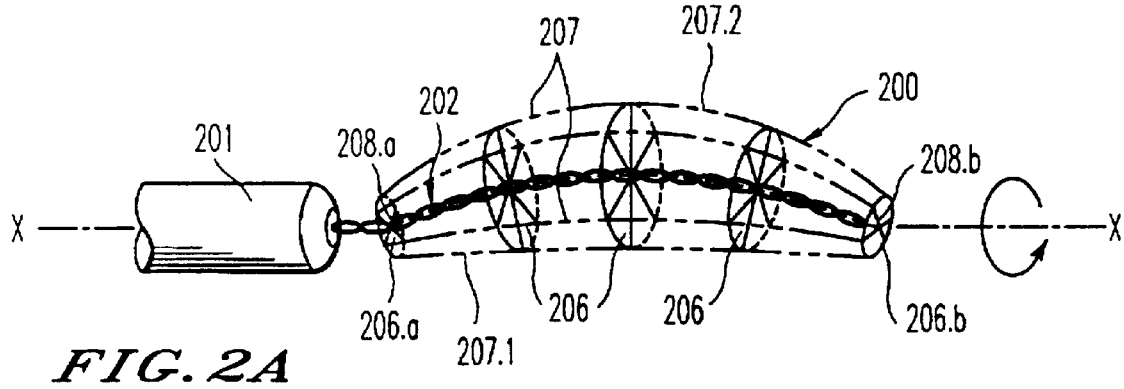
FIGS. 2A and 2B are perspective views of a brush according to the invention and made from the brush illustrated in FIG. 1.
Figure 2B:
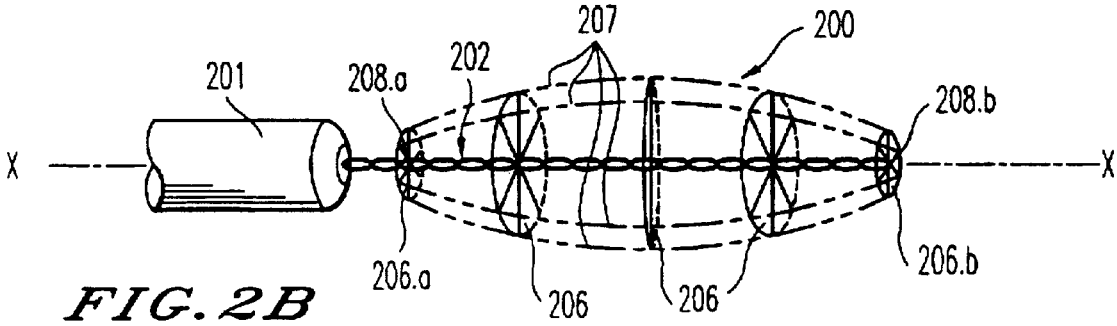

As a result of these operations, a brush 200 according to the invention, illustrated in FIGS. 2A and 2B, is obtained. In these figures, the reference numbers assigned to elements similar to those of FIGS. 1A and 1B are those of FIGS. 1A and 1B, increased by 100.

The brush of FIGS. 2A and 2B differs from that of FIG. 1 in that it has substantially the shape of an elongate banana, and in that the core 202 is curved, with a radius of curvature substantially equal to r. However, the centers of its ends 208.a and 208.b are aligned with the main axis X—X. The intersection of the surface 205 of the brush with the planes passing through the main axis X—X defines peak lines 207. FIG. 2B is obtained from FIG. 2A by a quarter-turn rotation about the main axis X—X. It can be seen in FIG. 2A that the cross-sections 206 converge, while the cross-sections 106 of the brush of FIG. 1 are parallel. The brush of FIG. 2A comprises a first substantially straight face 207.1, substantially parallel to the main axis X—X, and a second face 207.2 of maximum curvature, said faces being diametrically opposite one another with respect to the core 202. The passage from one peak line to another takes place continuously, with a continuous variation in the curvature from the face of maximum curvature 207.2 to the substantially straight face 207.1.

Figure 3A:
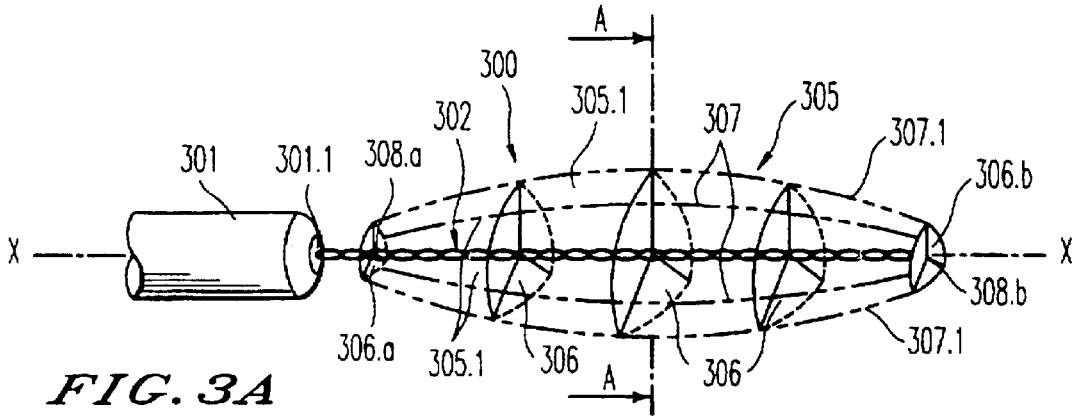
FIG. 3A is a perspective view of another brush capable of being used for manufacturing an embodiment of a brush according to the invention.
Figure 3B:
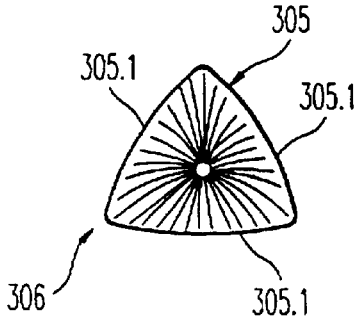
FIG. 3B is a cross-section along the plane A—A of the brush illustrated in FIG. 3A.

In FIGS. 3A and 3B, the reference numerals assigned to elements similar to those of FIGS. 1A and 1B are those of FIGS. 1A and 1B, increased by 200. The brush illustrated in FIGS. 3A and 3B differs from that of FIGS. 1A and 1B in its surface 305 which has the shape of a rugby ball comprising three substantially flattened faces 305.1, these three faces being separated from one from the other by rotation through 120° about the axis X—X. Each of the cross-sections 306 of the brush has the shape of a triangle with rounded corners. The meridian lines 307 have a variable curvature. The meridian lines 307.1 delimiting the faces 305.1 have the greatest curvature.

A first twist is imparted to the core 302 in the plane of one of the three meridian lines 307.1, between the ends 306.a and 306.b, by means of a suitable tool, for example by pressing the core longitudinally around a metal cylinder having a radius of curvature r', in such a way that said core assumes the same curvature r' as this meridian line 307.1, the twist being executed in the opposite direction to this meridian line so as to straighten the same; then, a second twist is imparted in the same plane, between the end 301.1 of the stem and the center 308.a of the end of the brush, so as to align the center 308.b of the other end of the brush with the main axis X—X in the same way as the center 308.a.

According to one version of the invention, the first twist may be imparted in the plane of any meridian line 307 in such a way that the core assumes the same curvature as this any meridian line 307 in the opposite direction to this meridian line. However, the selection of the meridian line having the greatest curvature makes it possible to obtain a brush whose plane part is denser and whose more curved part is more spaced out.

Figure 4A:
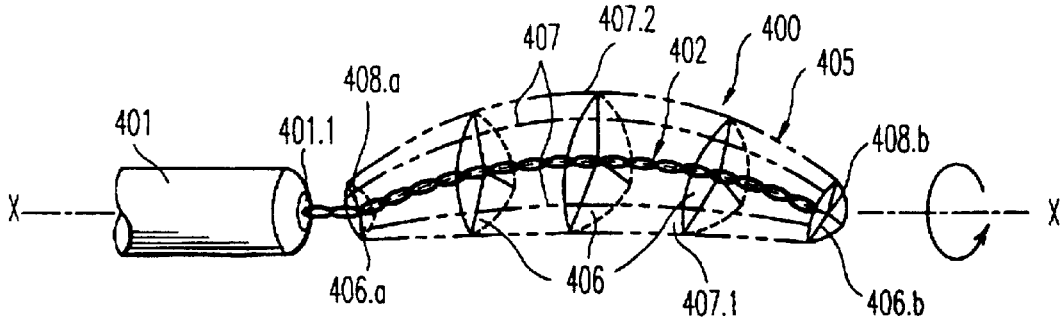
FIGS. 4A and 4B are perspective views of a brush according to the invention made from the brush illustrated in FIGS. 3A and 3B.
Figure 4B:
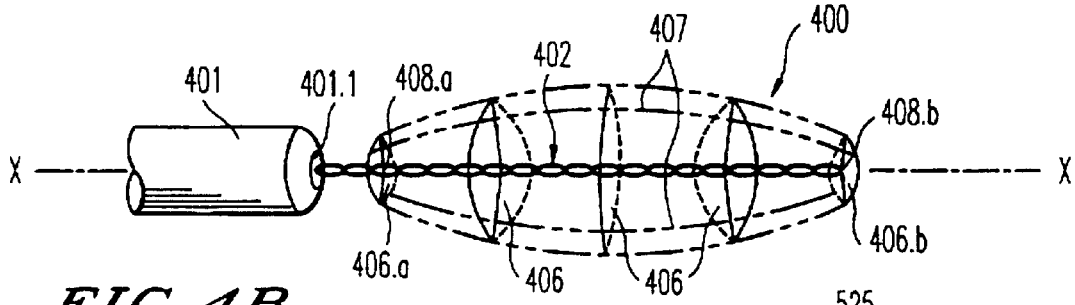

As the result of the operations described above, a brush 400 according to the invention, illustrated in FIGS. 4A and 4B, is obtained. The reference numbers assigned to elements similar to those of FIG. 3A are those of FIG. 3A, increased by 10.

The brush of FIGS. 4A and 4B differs from that of FIG. 2 in that the surface 405 has substantially the shape of an elongate banana comprising essentially three flattened faces. The core 402 is curved, its curvature r' is substantially equal to that of the meridian line 307.1 of the starting brush of FIG. 3A. The intersection of the surface 405 of the brush with the planes passing through the main axis X—X defines peak lines. Here, the face of maximum curvature is the peak line 407.2. The substantially straight face 407.1 is diametrically opposite it with respect to the core.

FIG. 4B is obtained from FIG. 4A by a quarter-turn rotation about the main axis X—X. It can be seen in FIG. 4A that the cross-sections 406 converge while the cross-sections 306 of the brush of FIG. 3A are parallel. The evolution of the curvature of the peak lines about the main axis X—X is continuous.

Figure 5:
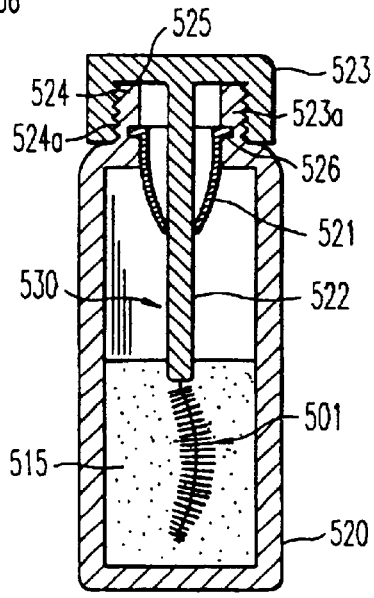
FIG. 5 is a sectional view of an eye make-up device.

The eye make-up device illustrated in FIG. 5 comprises a cylindrical reservoir 520 which has a threaded neck 524 surmounted by a seal 525 and which is filled with mascara 515. The reservoir 520 has a wiper 521 in its neck, the wiper being held in position in the neck by means of a bead 526 which cooperates with the shoulder separating the neck from the actual reservoir 520. The wiper 521 consists in a known way of a flexible and elastic material.

An applicator is intended for cooperating with the reservoir 520. The applicator consists of a grasping means 523 which supports the application member 530, the latter comprising a stem 522 and an application part 501 which are identical to those illustrated in FIGS. 2A and 2B. The grasping means 523 is in the form of a top and has a thread 523a cooperating with the thread 524a of the neck of the reservoir. The reservoir 520 is closed off sealingly by screwing the grasping means 523 onto the reservoir neck 524.

When the application member 530 is extracted from the reservoir, the applicator part 501 having the form of a brush loaded with mascara passes through the wiper 521. The latter wipes the bristles of the faces of high curvature to a much greater extent than the bristles of the straight faces.

When applied to the eyelashes, the brush loads each eyelash with product by means of its plane profile, then it combs the eyelash, elongates it and curves it using the rest of its surface.

In comparison with the conventional substantially convex brushes, the brush according to the invention affords the advantage of applying less product to the eyelashes. In comparison with brushes of varied curvatures, such as conventional curved cylindrical brushes (portions of a torus), the brush according to the invention affords the advantage of combining the eyelashes effectively, thus resulting in a better spreading of the product and a more pronounced lengthening and curving effect.

Obviously, numerous modifications and variations of the present invention are possible in light of the above teachings. It is therefore to be understood that the invention may be practiced otherwise than as specifically described herein.

What is claimed is:

1. A brush comprising:

a stem defining a main axis;

a flexible core having a first and a second end, the first end being integral with said stem; and bristles implanted radially in said core, the ends of the bristles defining the surface of the brush, wherein the intersection of any meridian plane of the brush [which passes through] *including* the main axis, with the surface of the brush, defines two meridian lines, and wherein the core is curved along its length such that one of said meridian lines at a first face of the surface is substantially straight in a direction parallel to the main axis.

2. The brush according to claim 1, wherein the core is at a center of each cross-section defined by the intersection of the surface of the brush with a plane perpendicular to the core.

3. The brush according to claim 1, wherein the surface of the brush comprises a second face at the other of said meridian lines and having a maximum curvature.

4. The brush according to claim 3, wherein the curvature of the meridian lines increases continuously from the first face to the second face.

5. The brush according to claim 1, wherein the brush has a single straight face.

6. The brush according to claim 1, wherein the brush has a single line of maximum curvature.

7. The brush according to claim 3, wherein the first face and the second face are diametrically opposite one another with respect to the core.

8. The brush according to claim 2, wherein the bristles of each of said cross-sections are all of the same length.

9. The brush according to claim 1, wherein the ends of the core are aligned with the main axis.

10. The brush according to claim 1, wherein the core is formed by two branches of a helically wound metal wire bent in the form of a U.

11. The brush according to claim 10, wherein the core is wound with a left-hand pitch.

12. The brush according to claim 1, wherein the surface of the brush has substantially the shape of an elongate banana.

13. The brush according to claim 1 including alternate rows of short and long bristles, only the long bristles being taken into account for defining the surface of the brush.

14. A brush according to claim 1, wherein the surface of the brush does not show any substantially concave portion.

15. A method for manufacturing a brush, comprising [the steps of]:

a) [forming] *providing* a starting brush having a stem defining a main axis, a flexible core having a first and a second end, the first end being integral with said stem, and bristles implanted radially in said core, the ends of the bristles defining the surface of the brush, wherein [the intersection of] any meridian plane of the brush [which passes through] *including* the main axis, *intersects* with the surface of the brush, [defines] *to define* two convex meridian lines; and b) imparting a curve to the core of the starting brush along its length such that a brush is formed which has a first face which is substantially straight in a direction parallel to the main axis.

16. The method according to claim 15, wherein an intersection of the surface of the starting brush with any plane perpendicular to the core, at each point of the core, defines a cross-section of the starting brush, wherein the core is central in relation to each cross-section.

17. The method according to claim 15, [including the step of imparting a twist to] *further comprising bending* the first end of the core so as to align the second end of the core with the main axis.

18. The method according to claim 15, wherein the surface of the starting brush has a meridian plane of symmetry.

19. The method according to claim 15, wherein the surface of the starting brush is a surface of revolution.

20. The method according to claim 15, wherein the starting brush has a plane of symmetry perpendicular to the axis of the core.

21. The method according to claim 15, wherein each cross-section of the starting brush is convex.

22. The method according to claim 15, wherein each cross-section of the starting brush is in the shape of a disk.

23. The method according to claim 15, wherein the surface of the starting brush is in the shape of a rugby ball.

24. The method according to claim 15, wherein each cross-section of the starting brush is in the shape of a triangle with rounded corners.

25. The method according to claim 15, wherein the surface of the starting brush is in the shape of a rugby ball having three substantially flattened faces.

26. The method according to claim 15, wherein the starting brush has a meridian line of greater curvature, wherein said [step of] imparting a curve comprises imparting a curve to the core in the opposite direction to said meridian line.

27. A make-up device comprising:

a mascara reservoir; and a member for the application of mascara, comprising a stem defining a main axis; a flexible core having a first and a second end, the first end being integral with said stem; and bristles implanted radially in said core, the ends of the bristles defining the surface of the brush, wherein [the intersection of any] *a* meridian plane of the brush [which passes through] *including* the main axis, *intersects* with the surface of the brush, [defines] *to define* two meridian lines, and wherein the core is curved along its length such that one of said meridian lines at a first face of the surface is substantially straight in a direction parallel to the main axis.

28. A make-up device according to claim 27, wherein the surface of the brush does not show any substantially concave portion.

*29. A brush comprising:*

*a core including first and second ends;*

*bristles extending radially from said core and being located between a first point along said core and a second point along said core, said bristles having ends defining a surface of said brush, said core being curved between said first and second points;*

*wherein a straight line passing through said first and second points defines an axis of said brush, and*

*wherein an intersection of said surface and a first meridian plane including said core defines a first meridian line segment and a second meridian line segment, said first meridian line segment being substantially straight in a direction parallel to said axis, and said second meridian line segment having convex curvature.*

*30. The brush according to claim 29, further comprising a stem on one of said first and second ends of said core.*

*31. The brush according to claim 30, wherein said stem is aligned with said axis.*

*32. The brush according to claim 30, wherein said stem is on said first end of said core and said second point is located at said second end of said core.*

*33. The brush according to claim 29, wherein an intersection of said surface of said brush and a second meridian plane passing through said core and being perpendicular to said first meridian plane defines third and fourth meridian line segments, said third meridian line segment being curved.*

*34. The brush according to claim 33, wherein curvature of said third meridian line segment is convex.*

*35. The brush according to claim 33, wherein said fourth meridian line segment is curved.*

*36. The brush according to claim 35, wherein curvature of said third and fourth meridian line segments is convex.*

*37. The brush according to claim 29, wherein said core is flexible.*

*38. The brush according to claim 29, wherein an intersection of said surface of said brush and a cross-sectional plane defines a cross-section of said brush, said cross-sectional plane including an intersection point along said core and being perpendicular to a line tangent to said core at said intersection point, and wherein bristles defining said surface at said intersection with said cross-sectional plane are of the same length.*

*39. The brush according to claim 29, wherein an intersection of said surface of said brush and a cross-sectional plane defines a cross-section of said brush, said cross-sectional plane including an intersection point along said core and being perpendicular to a line tangent to said core at said intersection point, and wherein said core is located in a central portion of said cross-section.*

*40. The brush according to claim 29, wherein said core is formed of two helically wound branches of a metal wire.*

*41. The brush according to claim 40, wherein said helical winding of said branches has a left-hand pitch.*

*42. The brush according to claim 29, wherein said bristles include short bristles and long bristles, and wherein said surface of said brush is defined by the long bristles.*

*43. The brush according to claim 29, wherein said surface of said brush has the shape of an elongate banana.*

*44. A device comprising:*

*the brush according to claim 29; and*

*a reservoir for containing a product to be applied by the brush.*

*45. The device according to claim 44, further comprising a wiper configured to wipe product from the bristles.*

*46. The device according to claim 44, wherein the reservoir contains mascara.*

*47. A method of manufacturing a brush, comprising:*

*providing a starting brush including*

*a core including first and second ends, said core being substantially straight, a line extending between two points on said core defining an axis,*

*bristles extending radially from said core and being located between a first point along said core and a second point along said core, said bristles having ends defining a surface of said starting brush, and*

*wherein an intersection of said surface and a meridian plane including said core defines a first meridian line segment and a second meridian line segment, said first meridian line segment having convex curvature; and*

*bending said core of said brush so that at least a portion of said first meridian line segment becomes substantially straight in a direction parallel to said axis.*

*48. The method according to claim 47, wherein said second meridian line segment has convex curvature.*

*49. The method according to claim 47, wherein said starting brush further comprises a stem on one of said first and second ends of said core.*

*50. The method according to claim 49, wherein said stem is on said first end of said core, and wherein the method further comprises bending said first end so that said stem becomes aligned with said axis.*

*51. The method according to claim 47, wherein an intersection of said surface of said starting brush and a cross-sectional plane defines a cross-section of said starting brush, said cross-sectional plane including an intersection point along said core and being perpendicular to a line tangent to said core at said intersection point, and wherein said core is located in a central portion of said cross-section.*

*52. The method according to claim 47, wherein said surface of said starting brush is symmetrical about a plane including said axis.*

*53. The method according to claim 47, wherein said surface of said starting brush is symmetrical about a cross-sectional plane including an intersection point along said core and being perpendicular to a line tangent to said core at said intersection point.*

*54. The method according to claim 47, wherein an intersection of said surface of said starting brush and a cross-sectional plane defines a cross-section of said starting brush, said cross-sectional plane including an intersection point along said core and being perpendicular to a line tangent to said core at said intersection point, and wherein said cross-section of said starting brush is disk-shaped.*

*55. The method according to claim 47, wherein said surface of said starting brush is in the shape of a rugby ball.*

*56. The method according to claim 47, wherein said surface of said starting brush is in the shape of a rugby ball having a plurality of substantially flat faces.*

*57. The method according to claim 47, wherein an intersection of said surface of said starting brush and a cross-sectional plane defines a cross-section of said starting brush, said cross-sectional plane including an intersection point along said core and being perpendicular to a line tangent to said core at said intersection point, and wherein said cross-section of said starting brush is in the shape of a triangle with rounded corners.*

*58. The method according to claim 48, wherein curvature of said core after said bending is substantially the same as curvature of said second meridian line segment before said bending.*

*59. A brush manufactured according to the method of claim 47.*

*60. A brush manufactured according to the method of claim 54.*

*61. A brush manufactured according to the method of claim 55.*

*62. A brush manufactured according to the method of claim 56.*

*63. A brush manufactured according to the method of claim 57.*

*64. A brush comprising:*

*a core including first and second ends, said core being curved along a length of said core;*

*a stem defining an axis of the brush, said stem being on one of said first and second ends of said core; and*

*bristles extending radially from said core and being located along said core, said bristles having ends defining a surface of said brush;*

*wherein an intersection of said surface and a first meridian plane including said core defines a first meridian line segment and a second meridian line segment, said first meridian line segment being substantially straight in a direction parallel to said axis, and said second meridian line segment having convex curvature.*

*65. The brush according to claim 64, wherein an intersection of said surface of said brush and a second meridian plane passing through said core and being perpendicular to said first meridian plane defines third and fourth meridian line segments, said third meridian line segment being curved.*

*66. The brush according to claim 65, wherein curvature of said third meridian line segment is convex.*

*67. The brush according to claim 65, wherein said fourth meridian line segment is curved.*

*68. The brush according to claim 67, wherein curvature of said third and fourth meridian line segments is convex.*

*69. The brush according to claim 64, wherein said core is flexible.*

*70. The brush according to claim 64, wherein an intersection of said surface of said brush and a cross-sectional plane defines a cross-section of said brush, said cross-sectional plane including an intersection point along said core and being perpendicular to a line tangent to said core at said intersection point, and wherein bristles defining said surface at said intersection with said cross-sectional plane are of the same length.*

*71. The brush according to claim 64, wherein an intersection of said surface of said brush and a cross-sectional plane defines a cross-section of said brush, said cross-sectional plane including an intersection point along said core and being perpendicular to a line tangent to said core at said intersection point, and wherein said core is located in a central portion of said cross-section.*

*72. The brush according to claim 64, wherein said core is formed of two helically wound branches of a metal wire.*

*73. The brush according to claim 72, wherein said helical winding of said branches has a left-hand pitch.*

*74. The brush according to claim 64, wherein said bristles include short bristles and long bristles, and wherein said surface of said brush is defined by the long bristles.*

*75. The brush according to claim 64, wherein said surface of said brush has the shape of an elongate banana.*

*76. A device comprising:*

*the brush according to claim 64; and*

*a reservoir for containing a product to be applied by the brush.*

*77. The device according to claim 76, further comprising a wiper configured to wipe product from the bristles.*

*78. The device according to claim 76, wherein the reservoir contains mascara.*

*79. A method of manufacturing a brush, comprising:*

*providing a starting brush including*

*a core including first and second ends, said core being substantially straight,*

*a stem defining an axis, said stem being on one of said first and second ends of said core, and*

*bristles extending radially from said core and being located along said core, said bristles having ends defining a surface of said starting brush, and*

*wherein an intersection of said surface and a meridian plane including said core defines a first meridian line segment and a second meridian line segment, said first meridian line segment having convex curvature; and*

*bending said core of said brush so that at least a portion of said first meridian line segment becomes substantially straight in a direction parallel to said axis.*

*80. The method according to claim 79, wherein said second meridian line segment has convex curvature.*

*81. The method according to claim 79, wherein said stem is on said first end of said core, and wherein the method further comprises bending said first end of said core so that said second end of said core becomes aligned with said axis.*

*82. The method according to claim 79, wherein an intersection of said surface of said starting brush and a cross-sectional plane defines a cross-section of said starting brush, said cross-sectional plane including an intersection point along said core and being perpendicular to a line tangent to said core at said intersection point, and wherein said core is located in a central portion of said cross-section.*

*83. The method according to claim 79, wherein said surface of said starting brush is symmetrical about a plane including said axis.*

*84. The method according to claim 79, wherein said surface of said starting brush is symmetrical about a cross-sectional plane including an intersection point along said core and being perpendicular to a line tangent to said core at said intersection point.*

*85. The method according to claim 79, wherein an intersection of said surface of said starting brush and a cross-sectional plane defines a cross-section of said starting brush, said cross-sectional plane including an intersection point along said core and being perpendicular to a line tangent to said core at said intersection point, and wherein said cross-section of said starting brush is disk-shaped.*

*86. The method according to claim 79, wherein said surface of said starting brush is in the shape of a rugby ball.*

*87. The method according to claim 79, wherein said surface of said starting brush is in the shape of a rugby ball having a plurality of substantially flattened faces.*

*88. The method according to claim 79, wherein an intersection of said surface of said starting brush and a cross-sectional plane defines a cross-section of said starting brush, said cross-sectional plane including an intersection point along said core and being perpendicular to a line tangent to said core at said intersection point, and wherein said cross-section of said starting brush is in the shape of a triangle with rounded corners.*

*89. The method according to claim 80, wherein curvature of said core after said bending is substantially the same as curvature of said second meridian line segment before said bending.*

*90. A brush manufactured according to the method of claim 79.*

*91. A brush manufactured according to the method of claim 85.*

*92. A brush manufactured according to the method of claim 86.*

*93. A brush manufactured according to the method of claim 87.*

*94. A brush manufactured according to the method of claim 88.*

*95. A brush comprising:*

*a stem defining a main axis;*

*a flexible core having a first and a second end, the first end being integral with said stem; and*

*bristles implanted radially in said core, the ends of the bristles defining the surface of the brush,*

*wherein a meridian plane of the brush including the main axis intersects with the surface of the brush to define two meridian lines, and wherein the core is curved along its length, and one of said meridian lines at a first portion of the surface is substantially straight in a direction parallel to the main axis.*

*96. The brush according to claim 95, wherein the core is at a center of each cross-section defined by the intersection of the surface of the brush with a plane perpendicular to the core.*

*97. The brush according to claim 95, wherein the surface of the brush comprises a second portion at the other of said meridian lines, said surface at the second portion having a maximum curvature.*

*98. The brush according to claim 97, wherein the curvature of the meridian lines increases continuously from the first portion to the second portion.*

*99. The brush according to claim 95, wherein the surface of the brush has a single straight portion.*

*100. The brush according to claim 95, wherein the surface of the brush has a single line of maximum curvature.*

*101. The brush according to claim 97, wherein the first portion and the second portion are diametrically opposite one another with respect to the core.*

*102. The brush according to claim 96, wherein the bristles of each of said cross-sections are all of the same length.*

*103. The brush according to claim 95, wherein the ends of the core are aligned with the main axis.*

*104. The brush according to claim 95, wherein the core is formed by two branches of a helically wound metal wire bent in the form of a U.*

*105. The brush according to claim 104, wherein the core is wound with a left-hand pitch.*

*106. The brush according to claim 95, wherein the surface of the brush has substantially the shape of an elongate banana.*

*107. The brush according to claim 95, wherein the bristles include alternate rows of short and long bristles, only the long bristles being taken into account for defining the surface of the brush.*

*108. A brush according to claim 95, wherein the surface of the brush does not show any substantially concave portion.*

*109. A brush comprising:*

*a core including first and second ends;*

*bristles extending radially from said core and being located between a first point along said core and a second point along said core, said bristles having ends defining a surface of said brush, said core being curved between said first and second points;*

*wherein a straight line passing through said first and second points defines an axis of said brush, and*

*wherein an intersection of said surface and a first meridian plane including said axis defines a first meridian line segment and a second meridian line segment, said first meridian line segment being substantially straight in a direction parallel to said axis, and said second meridian line segment having convex curvature.*

*110. The brush according to claim 109, further comprising a stem on one of said first and second ends of said core.*

*111. The brush according to claim 110, wherein said stem is aligned with said axis.*

*112. The brush according to claim 110, wherein said stem is on said first end of said core and said second point is located at said second end of said core.*

*113. The brush according to claim 109, wherein an intersection of said surface of said brush and a second meridian plane including said axis and being perpendicular to said first meridian plane defines third and fourth meridian line segments, said third meridian line segment being curved.*

*114. The brush according to claim 113, wherein curvature of said third meridian line segment is convex.*

*115. The brush according to claim 113, wherein said fourth meridian line segment is curved.*

*116. The brush according to claim 115, wherein curvature of said third and fourth meridian line segments is convex.*

*117. The brush according to claim 109, wherein said core is flexible.*

*118. The brush according to claim 109, wherein an intersection of said surface of said brush and a cross-sectional plane defines a cross-section of said brush, said cross-sectional plane including an intersection point along said core and being perpendicular to a line tangent to said core at said intersection point, and wherein bristles defining said surface at said intersection with said cross-sectional plane are of the same length.*

*119. The brush according to claim 109, wherein an intersection of said surface of said brush and a cross-sectional plane defines a cross-section of said brush, said cross-sectional plane including an intersection point along said core and being perpendicular to a line tangent to said core at said intersection point, and wherein said core is located in a central portion of said cross-section.*

*120. The brush according to claim 109, wherein said core is formed of two helically wound branches of a metal wire.*

*121. The brush according to claim 120, wherein said helical winding of said branches has a left-hand pitch.*

*122. The brush according to claim 109, wherein said bristles include short bristles and long bristles, and wherein said surface of said brush is defined by the long bristles.*

*123. The brush according to claim 109, wherein said surface of said brush has the shape of an elongate banana.*

*124. A device comprising:*

*the brush according to claim 109; and*

*a reservoir for containing a product to be applied by the brush.*

*125. The device according to claim 124, further comprising a wiper configured to wipe product from the bristles.*

*126. The device according to claim 124, wherein the reservoir contains mascara.*

*127. A method of manufacturing a brush, comprising:*

*providing a starting brush including*

*a core including first and second ends, said core being substantially straight, a line extending between two points on said core defining an axis,*

*bristles extending radially from said core and being located between a first point along said core and a second point along said core, said bristles having ends defining a surface of said starting brush, and*

*wherein an intersection of said surface and a meridian plane including said axis defines a first meridian line segment and a second meridian line segment, said first meridian line segment having convex curvature; and*

*bending said core of said brush so that at least a portion of said first meridian line segment becomes substantially straight in a direction parallel to said axis.*

*128. The method according to claim 127, wherein said second meridian line segment has convex curvature.*

*129. The method according to claim 127, wherein said starting brush further comprises a stem on one of said first and second ends of said core.*

*130. The method according to claim 129, wherein said stem is on said first end of said core, and wherein the method further comprises bending said first end so that said stem becomes aligned with said axis.*

*131. The method according to claim 127, wherein an intersection of said surface of said starting brush and a cross-sectional plane defines a cross-section of said starting brush, said cross-sectional plane including an intersection point along said core and being perpendicular to a line tangent to said core at said intersection point, and wherein said core is located in a central portion of said cross-section.*

*132. The method according to claim 127, wherein said surface of said starting brush is symmetrical about a plane including said axis.*

*133. The method according to claim 127, wherein said surface of said starting brush is symmetrical about a cross-sectional plane including an intersection point along said core and being perpendicular to a line tangent to said core at said intersection point.*

*134. The method according to claim 127, wherein an intersection of said surface of said starting brush and a cross-sectional plane defines a cross-section of said starting brush, said cross-sectional plane including an intersection point along said core and being perpendicular to a line tangent to said core at said intersection point, and wherein said cross-section of said starting brush is disk-shaped.*

*135. The method according to claim 127, wherein said surface of said starting brush is in the shape of a rugby ball.*

*136. The method according to claim 127, wherein said surface of said starting brush is in the shape of a rugby ball having a plurality of substantially flattened faces.*

*137. The method according to claim 127, wherein an intersection of said surface of said starting brush and a cross-sectional plane defines a cross-section of said starting brush, said cross-sectional plane including an intersection point along said core and being perpendicular to a line tangent to said core at said intersection point, and wherein said cross-section of said starting brush is in the shape of a triangle with rounded corners.*

*138. The method according to claim 128, wherein curvature of said core after said bending is substantially the same as curvature of said second meridian line segment before said bending.*

*139. A brush manufactured according to the method of claim 127.*

*140. A brush manufactured according to the method of claim 134.*

*141. A brush manufactured according to the method of claim 135.*

*142. A brush manufactured according to the method of claim 136.*

*143. A brush manufactured according to the method of claim 137.*

*144. A brush comprising:*

*a core including first and second ends, said core being curved along a length of said core;*

*a stem defining an axis of the brush, said stem being on one of said first and second ends of said core; and*

*bristles extending radially from said core and being located along said core, said bristles having ends defining a surface of said brush;*

*wherein an intersection of said surface and a first meridian plane including said axis defines a first meridian line segment and a second meridian line segment, said first meridian line segment being substantially straight in a direction parallel to said axis, and said second meridian line segment having convex curvature.*

*145. The brush according to claim 144, wherein an intersection of said surface of said brush and a second meridian plane including said axis and being perpendicular to said first meridian plane defines third and fourth meridian line segments, said third meridian line segment being curved.*

*146. The brush according to claim 145, wherein curvature of said third meridian line segment is convex.*

*147. The brush according to claim 145, wherein said fourth meridian line segment is curved.*

*148. The brush according to claim 147, wherein curvature of said third and fourth meridian line segments is convex.*

*149. The brush according to claim 144, wherein said core is flexible.*

*150. The brush according to claim 144, wherein an intersection of said surface of said brush and a cross-sectional plane defines a cross-section of said brush, said cross-sectional plane including an intersection point along said core and being perpendicular to a line tangent to said core at said intersection point, and wherein bristles defining said surface at said intersection with said cross-sectional plane are of the same length.*

*151. The brush according to claim 144, wherein an intersection of said surface of said brush and a cross-sectional plane defines a cross-section of said brush, said cross-sectional plane including an intersection point along said core and being perpendicular to a line tangent to said core at said intersection point, and wherein said core is located in a central portion of said cross-section.*

*152. The brush according to claim 144, wherein said core is formed of two helically wound branches of a metal wire.*

*153. The brush according to claim 152, wherein said helical winding of said branches has a left-hand pitch.*

*154. The brush according to claim 144, wherein said bristles include short bristles and long bristles, and wherein said surface of said brush is defined by the long bristles.*

*155. The brush according to claim 64, wherein said surface of said brush has the shape of an elongate banana.*

*156. A device comprising:*

*the brush according to claim 144; and*

*a reservoir for containing a product to be applied by the brush.*

*157. The device according to claim 156, further comprising a wiper configured to wipe product from the bristles.*

*158. The device according to claim 157, wherein the reservoir contains mascara.*

*159. A method of manufacturing a brush, comprising:*

*providing a starting brush including*

*a core including first and second ends, said core being substantially straight,*

*a stem defining an axis, said stem being on one of said first and second ends of said core, and*

*bristles extending radially from said core and being located along said core, said bristles having ends defining a surface of said starting brush, and*

*wherein an intersection of said surface and a meridian plane including said axis defines a first meridian line segment and a second meridian line segment, said first meridian line segment having convex curvature; and*

*bending said core of said brush so that at least a portion of said first meridian line segment becomes substantially straight in a direction parallel to said axis.*

*160. The method according to claim 159, wherein said second meridian line segment has convex curvature.*

*161. The method according to claim 159, wherein said stem is on said first end of said core, and wherein the method further comprises bending said first end of said core so that said second end of said core becomes aligned with said axis.*

*162. The method according to claim 159, wherein an intersection of said surface of said starting brush and a cross-sectional plane defines a cross-section of said starting brush, said cross-sectional plane including an intersection point along said core and being perpendicular to a line tangent to said core at said intersection point, and wherein said core is located in a central portion of said cross-section.*

*163. The method according to claim 159, wherein said surface of said starting brush is symmetrical about a plane including said axis.*

*164. The method according to claim 159, wherein said surface of said starting brush is symmetrical about a cross-sectional plane including an intersection point along said core and being perpendicular to a line tangent to said core at said intersection point.*

*165. The method according to claim 159, wherein an intersection of said surface of said starting brush and a cross-sectional plane defines a cross-section of said starting brush, said cross-sectional plane including an intersection point along said core and being perpendicular to a line tangent to said core at said intersection point, and wherein said cross-section of said starting brush is disk-shaped.*

*166. The method according to claim 159, wherein said surface of said starting brush is in the shape of a rugby ball.*

*167. The method according to claim 159, wherein said surface of said starting brush is in the shape of a rugby ball having a plurality of substantially flattened faces.*

*168. The method according to claim 159, wherein an intersection of said surface of said starting brush and a cross-sectional plane defines a cross-section of said starting brush, said cross-sectional plane including an intersection point along said core and being perpendicular to a line tangent to said core at said intersection point, and wherein said cross-section of said starting brush is in the shape of a triangle with rounded corners.*

*169. The method according to claim 159, wherein curvature of said core after said bending is substantially the same as curvature of said second meridian line segment before said bending.*

*170. A brush manufactured according to the method of claim 159.*

*171. A brush manufactured according to the method of claim 165.*

*172. A brush manufactured according to the method of claim 166.*

*173. A brush manufactured according to the method of claim 167.*

*174. A brush manufactured according to the method of claim 168.*

* * * * *